United States Patent [19]
Divan et al.

[11] Patent Number: 5,969,957
[45] Date of Patent: Oct. 19, 1999

[54] SINGLE PHASE TO THREE PHASE CONVERTER

[75] Inventors: Deepakraj M. Divan, Madison; Robert Schneider, Middleton, both of Wis.

[73] Assignee: Soft Switching Technologies Corporation, Middleton, Wis.

[21] Appl. No.: 09/018,356

[22] Filed: Feb. 4, 1998

[51] Int. Cl.[6] .................................................... H02M 3/36
[52] U.S. Cl. ............................ 363/36; 363/49; 318/768
[58] Field of Search .................................. 363/49, 4, 36; 318/768

[56] References Cited

U.S. PATENT DOCUMENTS

| | | |
|---|---|---|
| 3,522,502 | 8/1970 | Tuchen . |
| 3,527,995 | 9/1970 | Lee et al. . |
| 4,060,754 | 11/1977 | Kirtley, Jr. et al. . |
| 4,618,809 | 10/1986 | Maeda . |
| 4,642,545 | 2/1987 | Lewus . |
| 4,719,550 | 1/1988 | Powell et al. . |
| 4,792,740 | 12/1988 | Smith ....................................... 318/768 |
| 4,899,268 | 2/1990 | Hollinger . |
| 4,910,450 | 3/1990 | Parker et al. . |
| 5,017,800 | 5/1991 | Divan . |
| 5,272,616 | 12/1993 | Divan et al. . |
| 5,402,053 | 3/1995 | Divan et al. . |

FOREIGN PATENT DOCUMENTS

| | | |
|---|---|---|
| 06-245471 | 12/1985 | Japan . |
| 2111326 | 6/1983 | United Kingdom . |

OTHER PUBLICATIONS

S.B. Dewan et al., "Steady–State Analysis of Static Single–Phase to Three–Phase Converters," IEEE IAS Conf. Rec., Dec. 1981, pp. 910–916.

S.K. Biswas, "A New Static Converter For The Operation of Three–Phase Motors on Single–Phase Supply," IEEE IAS Conf. Rec., Dec. 1986, pp. 1550–1554.

S.I. Khan et al., "A Novel Single to Three–Phase Static Converter," IEEE IAS Conf. Rec., Dec. 1987, pp. 658–665.

Colin Schauder, "Adaptive Speed Identification For Vector Control of Induction Motors Without Rotational Transducers," IEEE IAS Conf. Rec. Dec. 1989, pp. 493–499.

L. H. Soderholm et al., "Automatic Balance of Three–Phase Motor Currents for Variable Motor Loading Using a Static Phase Converter," IEEE Trans. on Industry Applications, vol. 26, No. 4, Jul./Aug. 1990, pp. 679–682.

C. Chen et al. "Simple Topologies For Single Phase AC Line Conditioning," Conference Record, IEEE–IAS Annual Meeting, Oct. 1991, pp. 911–917.

(List continued on next page.)

Primary Examiner—Shawn Riley
Attorney, Agent, or Firm—Foley & Lardner

[57] ABSTRACT

A converter for providing three phase power to a three phase load from a single phase supply includes an inverter connected to single phase input power lines and a bi-directional switch connected in series with one of the input power lines. The converter has three output lines, one connected to the inverter output, another connected to an input power line between the bi-directional switch and the inverter, and the third connected directly to the other input power line. The inverter switching devices are controlled to provide a signal on the output of the inverter to provide balanced three phase power on the converter output lines. This is preferably accomplished by pulse width modulation of an inverter output voltage reference signal derived by phase shifting the single phase input voltage signal by 60°. The inverter is preferably also controlled to phase shift the inverter output signal when necessary to ensure that the net power flow into the inverter is zero under light load conditions. During load start-up, the bi-directional switch is phase controlled to adjust the amplitude of the converter output current to thereby adjust the load current to limit inrush current levels and provide a soft starter by ramping up the current in the load.

38 Claims, 7 Drawing Sheets

OTHER PUBLICATIONS

P. Enjeti et al., "Economic Single Phase to Three Phase Converter Topologies For Fixed Frequency Output," IEEE APEC Conf. Rec. 1991, pp. 88–94.

J. Nesbitt et al., "A Novel Single Phase to Three Phase Converter," IEEE APEC Conf. Rec. 1991, pp. 95–99.

C. Chen et al., "A Single Phase to Three Phase Power Converter for Motor Drive Applications," IEEE IAS Conf. Rec., 1992, pp. 639–646.

P. Enjeti et al., "A Low Cost Single Phase to Three Phase Static Power Converter," IEEE Rural Electronics Conference, May 1992.

Chingchi Chen, "Cost Effective Topologies for Single–Phase Line Conditioning and Single Phase to Three–Phase Conversion for Motors Drives", Preliminary Thesis Proposal, Department of Electrical and Computer Engineering, University of Wisconsin–Madison, Jan. 18, 1993, pp. 62–94.

FIG. 3A

SINGLE PHASE TO THREE PHASE CONVERTER

FIELD OF THE INVENTION

This invention pertains generally to the field of electrical power conversion systems and particularly to power converters for converting single phase power to three phase power for driving three phase motor loads.

BACKGROUND OF THE INVENTION

Electric motors are employed in a variety of applications. For applications requiring less than one horsepower, single phase motors provide satisfactory performance. However, as power requirements increase into the integral horsepower range and beyond, single phase motors have lower performance, higher cost, and much greater failure rates than three phase motors. Consequently, where three phase power is available, for applications requiring all but the smallest drive motors, three phase motors are typically used.

Much of the demand for motors in the fifteen to one hundred horsepower range is in fluid handling applications, primarily irrigation pumping and oil well pumping, air handling applications, and more demanding applications such as grain handling, conveyers, saw mills, etc. Many of these applications are performed in remote rural areas where only single phase AC power is available. Thus, in order for a three phase motor to be used to perform these applications, a converter for converting the available single phase AC power to three phase power is required.

Various solutions have been proposed for converting single phase power to three phase power to allow three phase motors to be utilized where only single phase power is available. Some such single phase to three phase converters have been available commercially. The most commonly employed solutions include rotary and reactive phase converters. Rotary phase converters use motor-generator sets to provide single phase to three phase power conversion. Rotary phase converters include traditional phase shifted motor solutions, as well as more unconventional solutions. However, all such solutions are generally limited by high start-up current levels, require minutes to spin up to speed, have very poor efficiency, are very bulky, and are relatively very expensive. Reactive phase converters employ passive components, such as transformers and capacitors, and relays to provide single phase to three phase power conversion. Reactive phase converters thus also tend to be heavy and bulky. Reactive phase converters tend to be more efficient than rotary phase converters, but require extensive tuning to operate with any given load. Furthermore, reactive phase converters cannot be used in applications where loading conditions vary substantially. Significant three phase motor unbalance can occur in such situations.

An alternative solution which may be employed in many cases is to use a three phase inverter, derated to operate from a single phase line, to convert single phase power to three phase power. Such a solution may take advantage of the variable speed operation, high torque across the speed range, and limited inrush current drawn from the input line which are features of many conventional three phase to three phase inverter designs. However, when a three phase to three phase inverter is employed for single phase to three phase power conversion, the input diode bridge, input capacitors, input line inductors, and any other input side switch gear and fusing employed in the inverter must be derated. The RMS current on a single phase input line would be approximately 73% higher than for the three phase input case, and the input side diodes would see approximately 80% more current stress than in the three phase input case under rated load for which the inverter was designed. This suggests that a user would need to select an inverter which was rated at least 50% higher than the name plate rating for three phase inputs for the single phase to three phase application. It is also likely that the DC bus voltage would droop to unacceptable levels in the three phase to three phase inverter, unless the DC bus capacitance is substantially increased, for single to three phase power conversion applications. Finally, with the single phase input bridge, the overall input power factor of a three phase to three phase converter is likely to be around 0.65–0.7, unless a large input DC reactor is used. All of this suggests that a standard three phase to three phase inverter may not provide a cost effective solution for operation of a three phase motor load from a single phase input supply, unless the capability of torque control or variable speed operation is required for the end use application.

To overcome some of the limitations of the methods for converting single phase to three phase power just discussed, single phase to three phase power converters employing power switching devices have been developed. To minimize costs, it is desirable that the number of power switching devices in a single phase to three phase converter be minimized. Some prior converters, which allow for variable speed drive of induction motors, utilize a full rectification of the single phase input power, with at least six switching devices in a full bridge inverter providing the three phase output power. While such systems effectively provide three phase power to drive motors at variable speeds, they are costly because of the number of switching devices required, which makes such systems economically impractical for many applications. In U.S. Pat. No. 5,272,616, to Divan, et al., a single phase to three phase converter which utilizes as few as two inverter switching devices, is disclosed. In this single phase to three phase converter design, two single phase input lines are directly connected to two inputs of a three phase motor. The input lines are also connected to the two-switching device inverter, the output of which is controlled to provide the third phase input to the three phase motor. To provide sufficient start-up torque, large capacitors are switched into the converter circuit, between the input and output lines, during motor start-up. The capacitors are switched out of the circuit after start-up. As described in U.S. Pat. No. 5,402,053, also to Divan, et al., this basic single phase to three phase converter design may be modified to eliminate the need for large starting capacitors by connecting a controllable bi-directional switch, such as a triac or back-to-back parallel thyristors, in one of the converter output lines connected to the three phase motor input. The bi-directional switch is operated as a single element variable frequency cyclo-converter and the inverter is operated as a variable frequency power supply to supply power to the motor at varying frequencies, lower than the single phase input power frequency, to start the motor and bring the motor up to speed. This single phase to three phase converter topology is also capable of being controlled to provide variable speed motor operation.

SUMMARY OF THE INVENTION

The present invention provides a low cost single phase to three phase power converter which is capable of providing soft start-up of an induction motor at a starting torque which can be matched to variable or constant torque applications, while limiting inrush current, and while providing efficient operation at full rated operating speed. The converter provides three phase balanced sinusoidal motor currents under most steady state operating conditions, a close to unity displacement factor, and low line current harmonics. The converter of the present invention will generally provide a higher power factor than the motor to which it is connected, with a typical overall power factor of approximately 0.94 under load. The converter of the present invention employs simple and extremely robust power conversion and control circuitry. Only three controlled switching devices are required to provide single phase to three phase power conversion with soft start capability.

The single phase to three phase power converter circuit of the present invention includes two AC input terminals with input lines connected thereto. An inverter circuit, which preferably includes a pair of DC bus lines, a pair of capacitors connected across the DC bus lines with a node between the capacitors, a pair of rectifying diodes connected across the DC bus lines with a second node connecting the diodes, and two controlled switching devices, such as transistors, which are connected together in series across the DC bus lines at an output node, is connected to the input lines via a controllable bi-directional switch, such as a triac or back-to-back parallel thyristors. The bi-directional switch is connected in series with one of the input lines between one of the input terminals and one of the input nodes of the inverter, such as the node connecting the rectifying diodes. The other input line is connected directly to the other input node of the inverter, e.g., the node connecting the DC bus capacitors. The converter circuit includes three output lines for providing, e.g., three phase power to a three phase induction motor load. One of the three phase output lines is connected to the first input line at a node located between the bi-directional switch and the inverter. A second of the output lines supplying the motor load is connected to the output node of the inverter, between the two inverter switching devices. The third output line is connected directly to the other AC input line.

An analog or digital controller circuit is employed to control the inverter switching devices and the bi-directional switch to provide low and controllable inrush current, soft start of a motor supplied by the converter, and balanced three phase voltage and currents in the motor under both start-up and steady state operating conditions. The inverter switching devices are preferably controlled using a pulse width modulation strategy to provide a sinusoidal voltage signal at the output of the inverter which is phase shifted by 60° from the single phase input AC line signal. Preferably, the controller monitors the input line voltage at the output of the bi-directional switch, phase shifts this input voltage signal by 60° to generate an inverter output voltage reference signal, and compares this reference signal to a high frequency, e.g., 6 kHz, triangle carrier signal, to generate inverter switching device control signals for controlling the inverter switching devices. Other well known pulse width modulation techniques which do not employ triangle carrier signals may also be used. Under steady state operating conditions, the bi-directional switch is fully turned on, and applies a sinusoidal voltage from the input terminals to the motor, on one converter output line, as well as to the inverter input. With the output of the inverter connected to another output line providing power to the motor, and the third output line providing power to the motor connected directly to the other input line, a balanced three phase fundamental voltage is provided to the induction motor under steady state operating conditions. The inverter may be controlled to provide either a positive or negative sequence three phase output, although the positive sequence is preferred.

At motor start-up, the bi-directional switch is operated as a soft-starter to ramp up the current in the corresponding motor phase in a controlled manner and to limit the inrush current on the AC input lines. This also provides a soft-charge for the inverter's DC bus. Control of the bi-directional switch to provide a soft-start is preferably performed by the controller circuit which monitors the current through the bi-directional switch and transforms the current level therethrough to a DC signal having an amplitude corresponding to the RMS value of the bi-directional switch current. This DC bi-directional switch current level signal is compared to a current limit set point and then provided to a proportional-integral controller. The maximum current limit set point is preferably user selectable based on the desired soft start characteristics. For higher starting torques, the maximum current limit set point may be set to allow the current provided to the load to ramp up to higher current levels. The output of the proportional-integral controller is provided to a bi-directional switch phase controller which provides bi-directional switch control signals for phase controlling the bi-directional switch to adjust the amplitude of the signal provided to the motor to provide the desired current level to the motor during start-up. Since the inverter is controlled based on the output signal from the bi-directional switch, the inverter switching devices will be controlled during start-up to provide an output signal to the motor which is phase shifted by 60° from the bi-directional switch output signal. Thus, the correct phase relationship between the three-phase outputs provided to the motor is maintained during motor start-up. However, the three phase output signal is shifted from the input signal by phase control of the bi-directional switch to adjust the output signal amplitude by the degree necessary to provide the current level to the motor which is required for soft start-up while limiting the inrush current to the desired level.

In accordance with the present invention, the converter controller preferably also controls the inverter switching devices to maintain proper inverter operation under various extreme operating conditions, and controls both the inverter switching devices and the bi-directional switch to prevent damage to the converter under extreme voltage and current conditions. For example, the controller preferably adjusts the inverter switching device control signals to maintain the desired inverter output signal level despite wide swings in the DC bus voltage that may occur during start-up. A DC bus feed forward compensator may be employed in the converter controller for this purpose. The DC bus feed forward compensator preferably operates by subtracting the measured DC bus voltage from a nominal DC bus voltage reference level signal. The resulting difference signal, which represents the variation of the DC bus voltage from the desired DC bus voltage level, is multiplied by a constant and the inverter output voltage reference signal and added to the inverter output voltage reference signal before the reference signal is modulated by the high frequency carrier signal. By adjusting the reference signal amplitude in this manner, the pulse width modulated output of the inverter is controlled to maintain the inverter output at the desired voltage level despite variations in the DC bus voltage level.

The controller preferably also controls the inverter switching devices to regulate the maximum DC bus voltage level. Under light load conditions, and potentially under motor starting conditions, the motor power factor can become very low. Under these conditions, it is likely that the direction of power flow into the inverter can be reversed. Thus, under such conditions, power can flow into the inverter from the motor, and charge the DC bus capacitors. This can be prevented by shifting the phase of the inverter output voltage signal such that the net power flow into the inverter is zero. The required phase shift may be implemented by the controller by subtracting the measured DC bus voltage from a maximum DC bus voltage set point threshold level signal. The resulting difference signal, representing the amount by which the DC bus voltage exceeds the maximum DC bus voltage level, is provided to a proportional-integral controller. For application to a wide range of motor types, it is preferable that the integrator time constant be on the order of one second. The integrator is preferably preset for maximum phase shift on start up. Once the motor is started, the integrator follows by ramping to the steady state condition. This guarantees that power will not flow back to the DC bus under the wide range of starting parameters of different motor types. The output of the proportional-integral controller is a sinusoidal signal which is multiplied by a sinusoidal signal representing the AC input voltage to the converter to generate a signal having an amplitude which, when added to the inverter output voltage reference signal, represents the inverter output phase shift needed to bring the net power flow into the inverter to zero. This phase shift signal is combined with the inverter output voltage reference signal to effectively shift the reference signal, and, therefore, the inverter output voltage signal, such that the net power flow into the inverter from both the converter input lines and the output lines is zero.

The converter controller preferably also includes a DC bus overvoltage protection circuit which turns off both the bi-directional switching device and the inverter switching devices, to thereby prevent any power flow into the DC bus capacitors, when the DC bus voltage exceeds a DC bus overvoltage threshold level. A peak current limiting circuit is also preferably employed to prevent damage to the inverter switching devices from excessive current flowing therethrough. Peak current limiting is provided by monitoring the output current of the inverter and turning off the inverter switching devices when the inverter current limit exceeds a peak current threshold level. The inverter switching devices are preferably turned back on when the monitored current level falls below a lower current threshold level. Thus, although the maximum current is limited, the current provided to a motor load is preferably not completely cut off during a cycle so that the motor is not shut down.

The single phase to three phase converter of the present invention provides a very low cost circuit for the soft start-up and steady state operation of three phase induction motors from a single phase supply. The present invention is applicable to three phase motors of any size, but will find its greatest application in providing power for three phase motors of integral horsepower or higher, and especially three phase motors in the 10–100 horsepower range. The converter of the present invention provides balanced three phase output power to an induction motor with high input line side displacement and power factors, and low input side current total harmonic distortion. On the output (motor) side, the converter of the present invention provides low motor current ripple and low torque ripple. The inrush current at start-up may be limited to one to three p.u. (per unit) and the full load starting torque at zero speed may be controlled to 10% to 100% of full load torque by adjusting the amplitude of the current provided to the motor and the inverter via phase control of the bi-directional switch. The power and control circuitry of a converter in accordance with the present invention is simple, compact, inexpensive, and very robust. The converter is also highly efficient, typically achieving greater than 97% efficiency. The converter of the present invention is also insensitive to motor side parameters such as motor type, load inertia, etc.

Further objects, features, and advantages of the invention will be apparent from the following detailed description when taken in conjunction with the accompanying drawings.

DETAILED DESCRIPTION OF THE INVENTION

Figure 1:
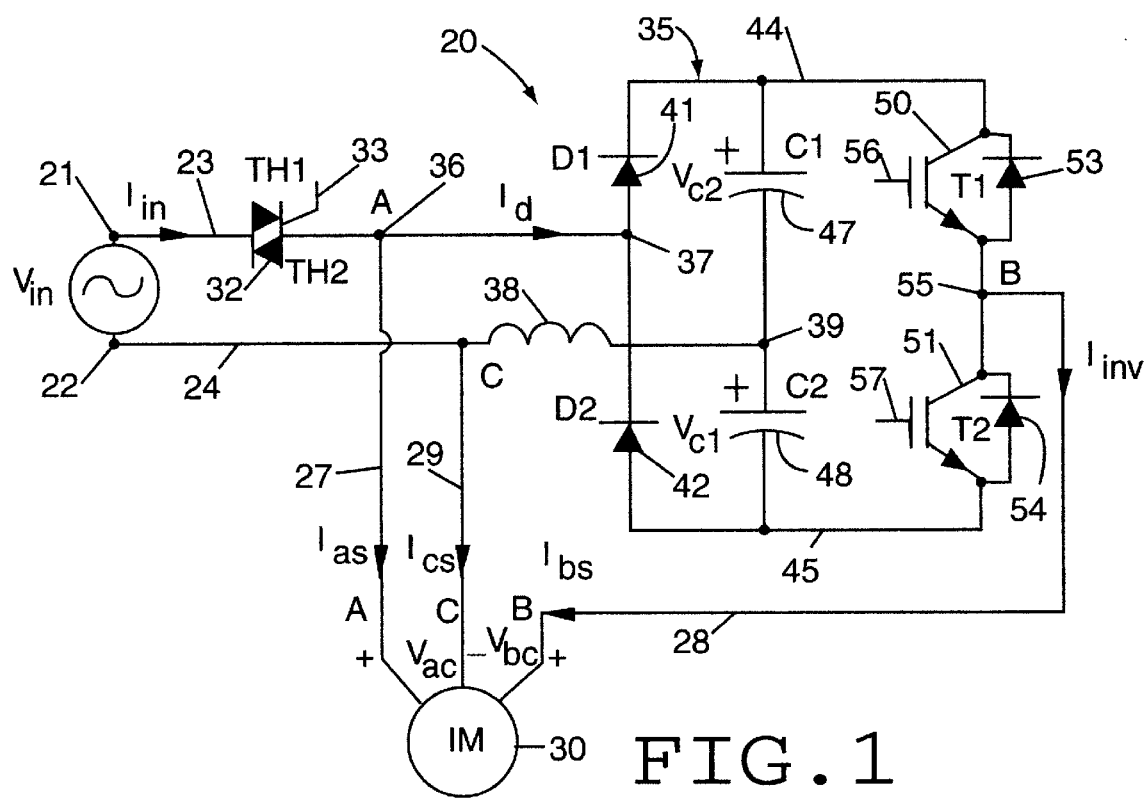
FIG. 1 is a schematic circuit diagram of a single phase to three phase converter for driving a three phase induction motor in accordance with the present invention.

A schematic circuit diagram of a single phase to three phase converter in accordance with the present invention is shown generally at 20 in FIG. 1. The converter receives single phase AC input power at first and second input terminals 21 and 22, which are connected to first and second input lines 23 and 24, respectively. Three phase power is provided on three output lines 27, 28, and 29, which are illustratively shown connected to an induction motor 30 which is driven by the three-phase output from the converter 20. A bi-directional switch 32, such as a triac or paralleled thyristors, which has a gate control line 33, is connected in series with one of the input lines 23. An inverter circuit 35 is connected across the input lines 23 and 24, such that the bi-directional switch 32 is located between one of the input terminals 21 and the inverter circuit 35. One of the output lines 27 is connected to one of the single phase input lines 23 at a node 36 located between the bi-directional switch 32 and the inverter 35. Another output line 28 is connected to receive power from the inverter 35. The third output line 29 is connected directly to the other single phase input line 24.

The inverter circuit 35 is connected to receive the AC input power on the single phase input lines 23 and 24. The input line 23 is connected, via the bi-directional switch 32, to a first input node 37 of the inverter circuit 35. The second input line 24 is connected, through a filter inductor 38, to a second input node 39 of the inverter circuit. Two diodes 41 and 42 are connected together at the first input node 37 in series between two DC bus lines 44 and 45 of the inverter. Two DC bus capacitors 47 and 48 are connected together at the second input node 39 in series across the DC bus lines 44 and 45. In operation, the diodes 41 and 42 rectify the AC signal on the input lines 23 and 24. The rectified signal is applied across the nodes 37 and 39 to thereby charge the DC bus capacitors 47 and 48 to provide a substantially stable DC bus voltage across the DC bus lines 44 and 45 from a stable AC signal on the input lines 23 and 24. Two inverter switching devices 50 and 51, such as IGBTs, each having integral anti-parallel diodes 53 and 54, respectively, are connected together at a node 55 in series across the DC bus lines 44 and 45. The node 55 is the inverter 35 output node and is connected to the output line 28. The switching devices 50 and 51 are controlled by control signals provided on their gate lines 56 and 57, respectively, to invert the DC voltage on the DC bus lines 44 and 45 to synthesize an AC voltage or current signal at the output node 55 and, therefore, on output line 28.

Figure 2:
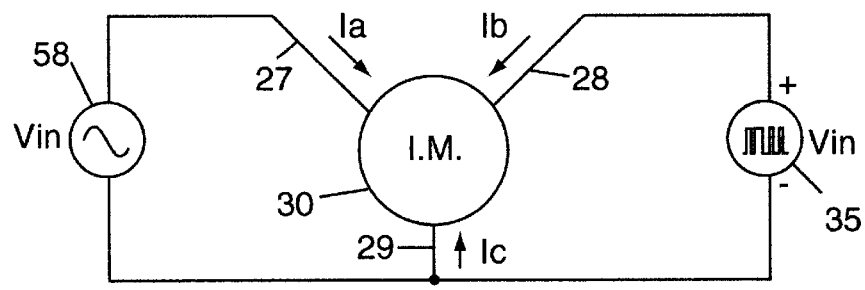
FIG. 2 is an equivalent circuit for the converter-motor circuit of FIG. 1.

In accordance with the present invention, the switching of the bi-directional switch 32 and of the two inverter switching devices 50 and 51 is controlled to provide three-phase power to start and run a motor 30 or other three-phase load. The inverter switching devices 50 and 51 are preferably controlled to provide an AC voltage signal on output line 28 which is phase shifted by 60° from the input voltage signal on input lines 21 and 22. A pulse width modulation (PWM) control scheme is preferably used to control the inverter switching devices 50 and 51 to provide the desired phase shifted output voltage waveform on output line 28. With an AC voltage signal $V_{in}$ applied to the input terminals 21 and 22 of the converter 20, and with the inverter switching devices 50 and 51 controlled to provide the desired output signal $V_{inv}$ on output line 28 of the converter 20, the motor 30 is effectively provided power by two single phase voltage sources, as illustrated in the simplified equivalent circuit diagram of FIG. 2. A single phase input voltage source 58 provides an AC input voltage signal, $V_{in}$, e.g., 120 or 240 volts RMS at 60 Hz, across output lines 27 and 29 of the converter 20. The inverter 35 is controlled to provide a pulse width modulated AC voltage signal, $V_{inv}$, of corresponding amplitude and frequency, across output lines 28 and 29 of the converter 20. The substantially square wave PWM output of the inverter 35 is filtered by the winding inductance of the motor 30 into a substantially sinusoidal AC voltage waveform. As will be explained in more detail below, if the inverter output $V_{inv}$ is controlled so as to be phase shifted by 60° from the single phase input voltage $V_{in}$, the voltage signals provided to the motor 30 on output lines 27, 28, and 29 of the converter will be balanced three phase output voltage waveforms, with the three phase voltages, and corresponding phase currents $i_a$, $i_b$, and $i_c$ on output lines 27, 28, and 29, respectively, separated from each other by 120°.

Under steady state operating conditions, the bi-directional switch 32 is fully turned on, and the sinusoidal AC input voltage signal $V_{in}$ is applied directly to the motor 30 as well as to the inverter 35. During start-up of the motor 30, the bi-directional switch 32 is controlled to limit inrush current and provide a soft start for the motor 30. This also provides a soft charge for the inverter's DC bus. Controlled inrush current and ramp up of the current in the motor 30 to provide soft start-up is achieved by phase controlling the bi-directional switch 32 to limit the amplitude of the signal provided to the motor 30 from the single phase voltage signal on the input lines 23 and 24. This achieves the effect of a reduced voltage starter. The start-up inrush current limit and the ramp up rate of the current provided to the motor at start-up may preferably be regulated at any desired user selectable value.

The inverter switching devices 50 and 51 are preferably also controlled to provide a regulated inverter output voltage level in the presence of wide swings in the DC bus voltage which may occur during motor start-up. Also, under light load conditions, and potentially under motor starting conditions, the motor power factor can become very low. Under these conditions, it is likely that the direction of power flow into the inverter 35 is reversed. Preferably, inverter switching devices 50 and 51 are also controlled to shift the phase of the inverter output when such conditions occur such that net power flow into the inverter from the input and output lines is zero.

The inverter switching devices 50 and 51 and the bi-directional switch 32 are preferably turned off if the DC bus voltage becomes excessive, to thereby prevent any further power flow into the inverter DC bus which might damage the inverter. The inverter switching devices 50 and 51 are also preferable turned off if the inverter output current exceeds a peak current limit threshold level. This is done to protect the inverter switching devices 50 and 51 from damage due to excessive current flow therethrough. The inverter switching devices 50 and 51 are preferably turned back on when the inverter output current falls below a lower current threshold level. Thus, although the maximum inverter current is limited, the current provided to a motor load is preferably not completely cut off during a cycle so that the motor is not shut down.

Control of the inverter switching devices 50 and 51 and the bi-directional switch 32 to perform the functions just described is provided by a converter controller which will be described in more detail below.

An exemplary implementation of a single phase to three phase converter 60 in accordance with the present invention will now be described in more detail with reference to the schematic circuit diagram of FIG. 3. Note that the reference numerals of FIG. 1 are used to identify corresponding components of the circuit illustrated in FIG. 3. In the exemplary circuit 60 of FIG. 3, the bi-directional switch 32 is implemented using paralleled thyristors 62 and 63. An RC filter, including capacitor 64 and resistor 65 is connected in parallel across the bi-directional switch 32. The DC bus capacitors 47 and 48 in the inverter 35 of the exemplary converter circuit 60 are implemented using multiple parallel capacitors. A capacitor 66, connected in series with a diode 67 across which a resistor 68 is connected in parallel, is also connected in parallel with the DC bus capacitors 47 and 48 across the DC bus lines 44 and 45 of the inverter 35. These circuit components provide snubbing for the inverter switching devices 50 and 51, which are implemented as IGBTs.

In the exemplary circuit 60, the bi-directional switch 32 and inverter switching devices 50 and 51 are controlled to provide single phase to three phase power conversion in accordance with the present invention by an analog controller circuit 70. Although the controller 70 in this exemplary embodiment 60 is implemented as an analog integrated circuit, a controller for the switching devices of a single phase to three phase converter in accordance with the present invention may be implemented using discrete analog or digital components, programmable digital circuitry such as a microprocessor or digital signal processor, or any combination thereof. The operation of the controller 70 to control the single phase to three phase converter in accordance with the present invention will be described in more detail below.

An integrated circuit power supply 72 is preferably connected, via lines 73 and 74, across the converter input lines 23 and 24. From the, e.g., 230 volt AC single phase power provided on input lines 23 and 24, the power supply circuit 72 provides the low voltage DC signals, e.g., +12 V and −12 V, required by the analog integrated controller circuit 70 to the controller circuit 70 on lines 75. Any conventional integrated circuit power supply 72 may be used for this purpose. Preferably, a power supply 72 having a wide input voltage range is employed. This will allow for operation of the converter 60 even under low input line voltage conditions.

Start and stop mechanisms 76 and 77 are preferably provided for starting and stopping operation of the single phase to three phase converter 60, and, therefore, for starting and stopping a motor to which the converter 60 is connected. Interval push button switches 76 and 77 may be used to implement the start and stop mechanisms. When the start button 76 is actuated, a start signal is provided to the controller 70 which, in response to the start signal, begins controlling the bi-directional switch 32 and the inverter switching devices 50 and 51 to ramp up the current provided on output lines 27, 28 and 29 to soft start a motor connected to the output lines while limiting start-up inrush current to a desired value. When the stop button 77 is actuated, a stop signal is provided to the controller 70, which responds to the stop signal by ceasing to provide further control signals to the bi-directional switch 32 or to the inverter switching devices 50 and 51, thereby cutting off power on the output lines 27, 28 and 29 to the motor load. It should be apparent that various other types of mechanisms, including a single switch mechanism, may be used to provide start and stop signals to the converter controller 70.

The converter 60 preferably includes operator indicators for providing a user of the device with information concerning the state of operation of the device. Such operator indicators may be implemented in any conventional manner. For example, LEDs 80, 81, 82, and 83 may be provided and controlled by the converter controller 70 to provide such information to an operator of the converter 60. A green LED 80 may be illuminated by the controller 70 whenever the converter 60 is in operation providing power to a load. A red LED 81 may be illuminated by the controller 70 when an undervoltage condition is detected by the controller 70. Another red LED 82 may be illuminated by the controller 70 when the inverter current exceeds a peak current limit threshold level. A third red LED 83 may be illuminated by the controller 70 when an overvoltage condition across the DC bus lines is detected by the controller 70. As will be discussed in more detail below, the controller 70 preferably also responds to such overvoltage and overcurrent conditions by turning off the bi-directional switching device 32 (overvoltage condition) and inverter switching devices 50 and 51 (both conditions) to prevent damage to the inverter 35 under such conditions.

In accordance with the present invention, the bi-directional switch 32 is phase controlled during start-up to limit the amplitude of the current signal provided on the output lines 27, 28 and 29 to thereby regulate the start-up inrush current at any desired value. The desired maximum value of inrush current is preferably user selectable. A variable resistor 84 may be provided for this purpose. A user of the single phase to three phase converter 60 may set the maximum inrush current to a desired level by adjusting the value of the variable resistor 84. The variable resistor value is sensed by the controller 70 which, in turn, phase controls the bi-directional switch 37 to regulate the inrush current to the desired value in the manner to be described in more detail below.

The controller circuit 70 employs various measured voltage and current signals to provide control of the bi-directional switch 32 and inverter switching devices 50 and 51. The measured voltage signals preferably include the DC bus voltage across the DC bus lines 44 and 45, the AC input voltage across the input terminals 21 and 22, and the voltage across the input lines 23 and 24 as taken at a node 36 between the bi-directional switch 32 and the inductor 38. These voltage signals may be provided directly to the analog controller 70. The current signals which are preferably monitored by the controller 70 include the current provided through the bi-directional switch 32 from the input line 23 to the output line 27, and the inverter output current provided on output line 28. The current on output line 27 may be monitored using a current transformer 86 which provides an output voltage signal on line 87 to the controller 70 which is related to the current on output line 27. Similarly, a current sensor 88 may be used to provide a voltage signal on line 89 to the controller 70 which is related to the inverter output current on output line 28. Any conventional method for monitoring voltage and current levels may be used to provide the desired voltage and current measurements to the controller 70.

Figure 3A:
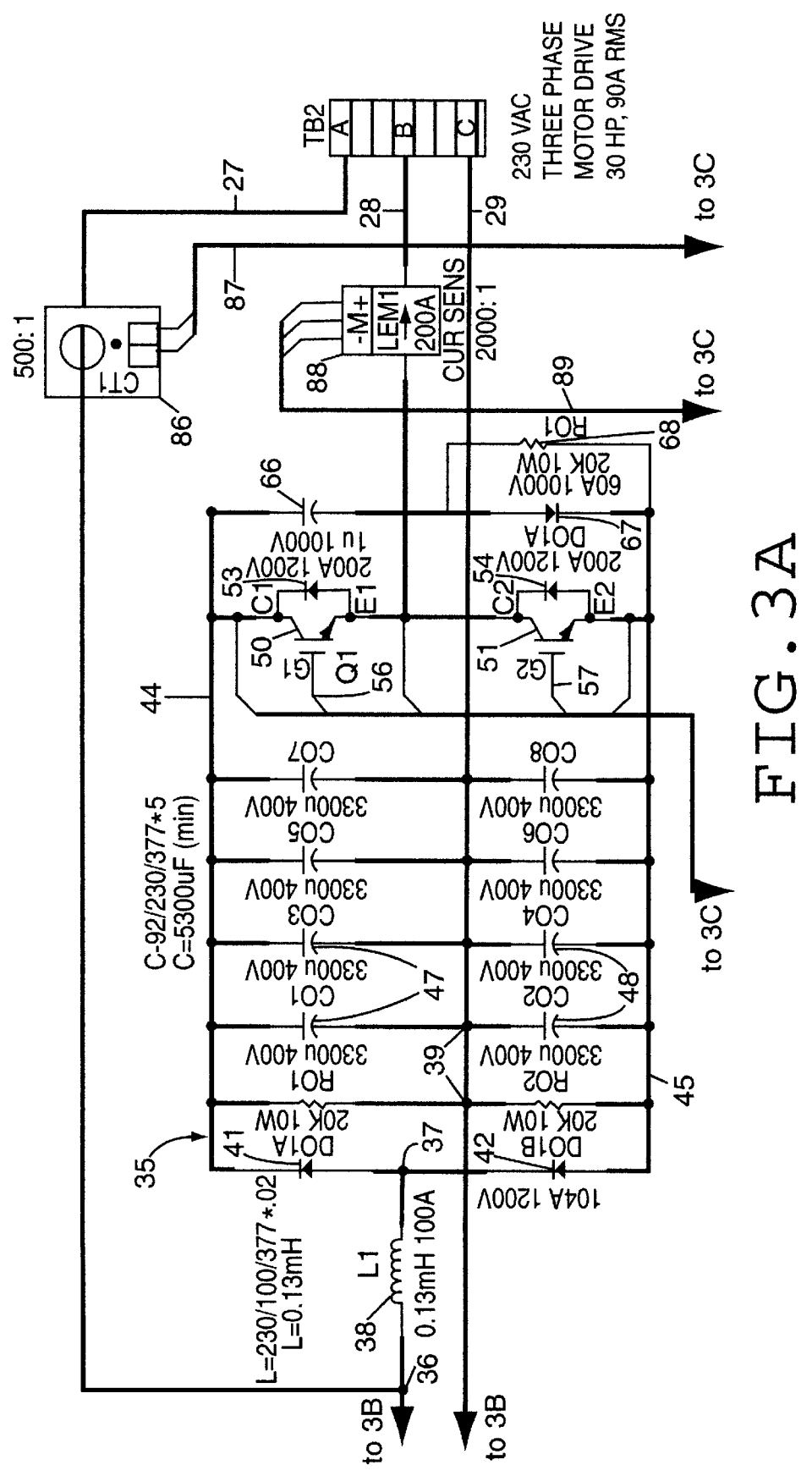
Figure 3B:
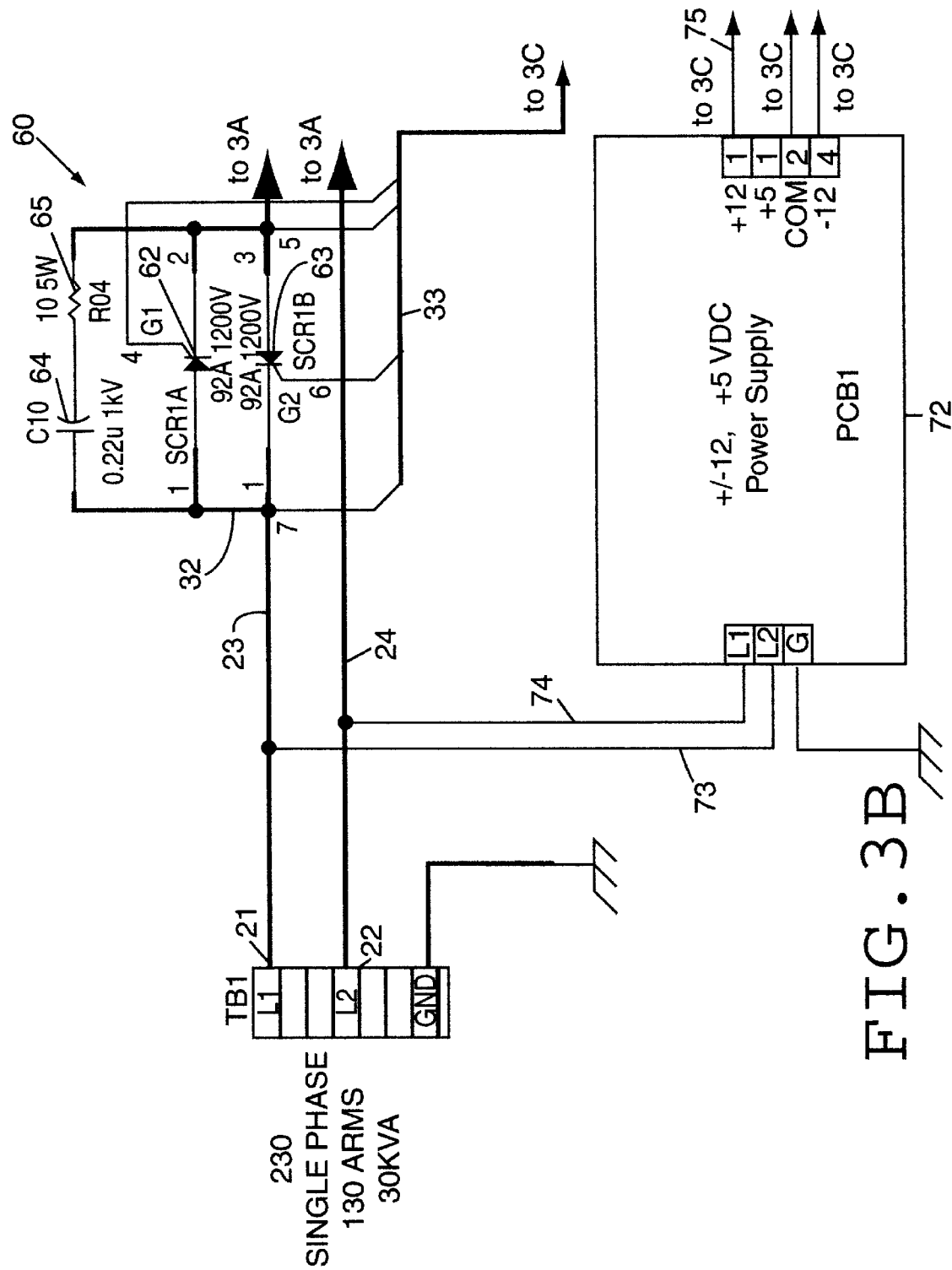
FIG. 3 is a more detailed schematic circuit diagram of an exemplary single phase to three phase converter in accordance with the present invention.
Figure 3C:
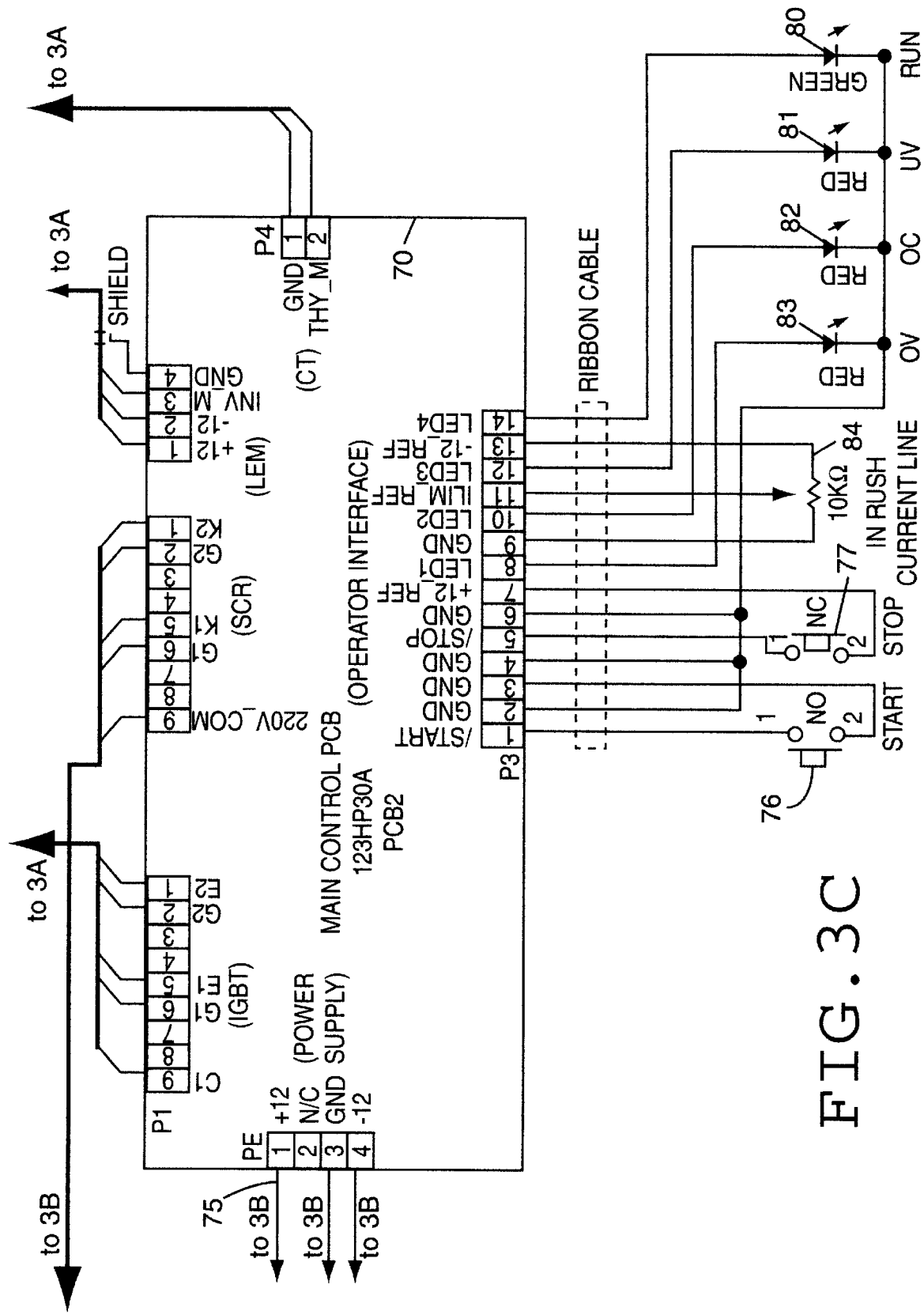

The exemplary converter circuit 60 illustrated in FIG. 3 is designed to provide a 230 volt AC three phase motor drive signal sufficient to drive a 30 horsepower motor at 90 amps RMS from a 230 volt AC single phase 130 amp RMS input voltage source. Of course, by selecting the proper component values, a single phase to three phase converter in accordance with the present invention may be applied to provide power to any size motor desired. Examination of the exemplary circuit 60 illustrated in FIG. 3 shows that a single phase to three phase converter in accordance with the present invention may be implemented using a hardware configuration which is much simpler than that of a correspondingly rated three phase inverter operated from a single phase input. Thus, a single phase to three phase converter in accordance with the present invention may be implemented in a much smaller and lighter package than a derated three phase to three phase converter operated as a single phase to three phase converter. For example, a 3 kVA rated single phase to three phase converter in accordance with the present invention could be packaged into a unit no larger than 650 cubic inches, and would weigh approximately 12 pounds.

Figure 4:
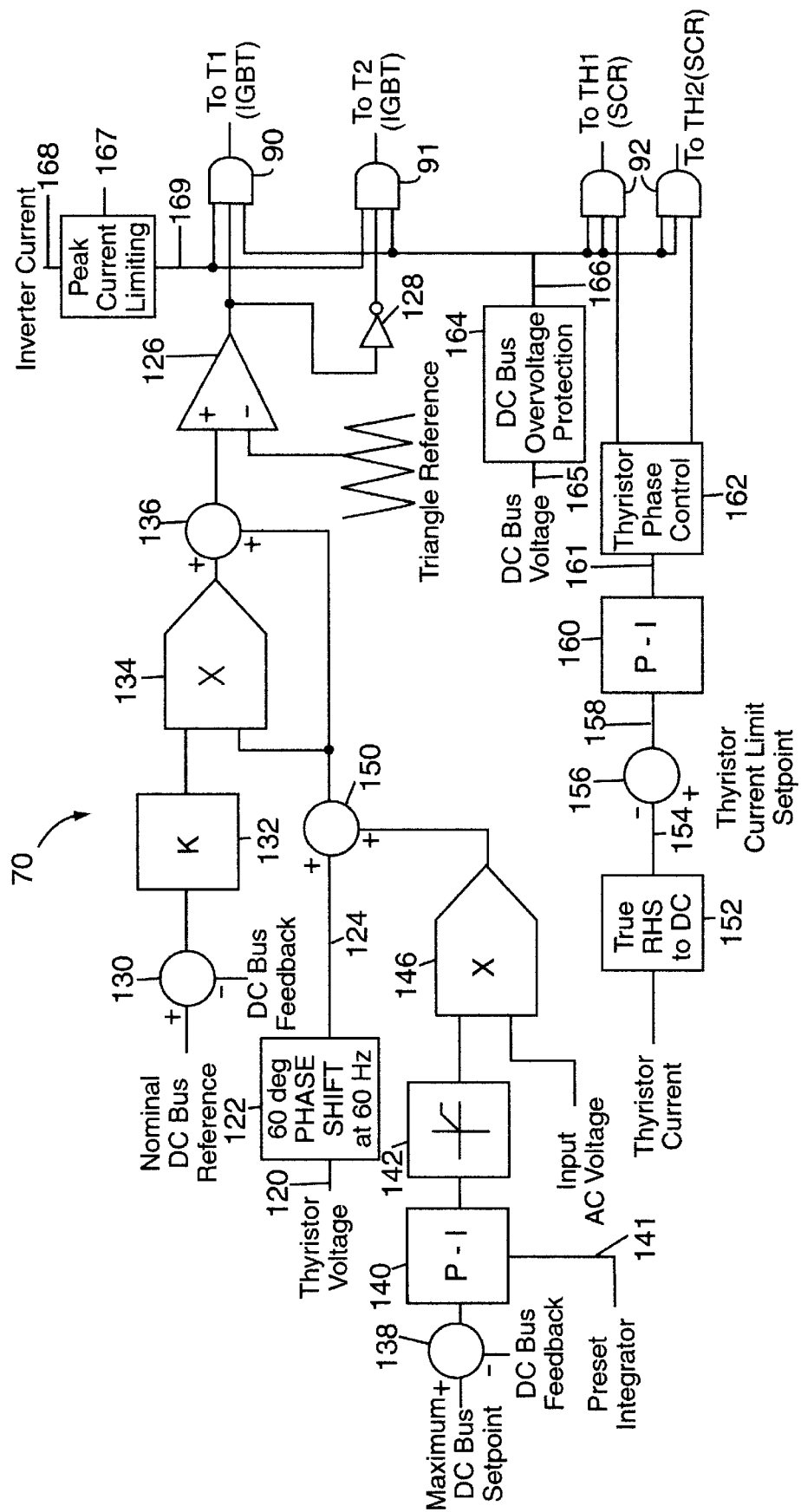
FIG. 4 is a block diagram of an exemplary controller structure for controlling the inverter and bi-directional switch of a single phase to three phase converter in accordance with the present invention.

Operation of the controller 70 to control switching of the bi-directional switch 32 and inverter switching devices 50 and 51 to provide single phase to three phase power conversion in accordance with the present invention will now be described in detail with reference to the schematic block diagram of FIG. 4. The controller circuit 70 operates to provide inverter switching device control signals to the inverter switching devices 50 and 51 from AND gates 90 and 91, respectively, and bi-directional switching device control signals to the bi-directional switching device 32 from bi-directional switching device AND gates 92. The control signals provided as outputs from gates 90, 91, and 92 may be amplified as necessary, in a conventional manner, to provide gate drive signals which are applied to control lines 56, 57, and 33, to operate the inverter switching devices 50 and 51 and bi-directional switch 32, respectively. Control of the inverter switching devices 50 and 51 to provide a desired balanced three phase output voltage waveform on converter output lines 27, 28, and 29 will now be described in detail. Control of the bi-directional switching device 32 to provide soft start-up and low inrush current will be described in more detail below.

Figure 5:
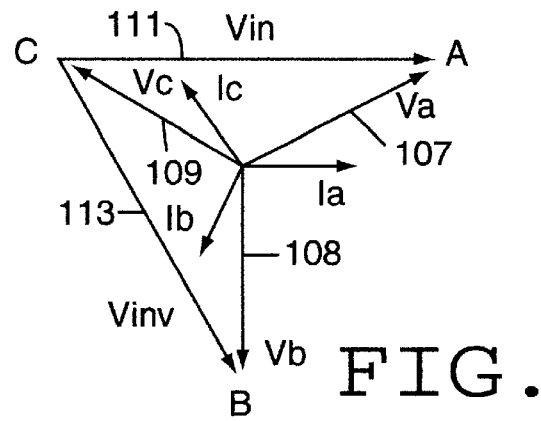
FIG. 5 is a phasor diagram illustrating operation of the single phase to three phase converter of the present invention in a positive sequence.

The basic strategy for controlling the inverter switching devices 50 and 51 is to realize an open delta configuration using the AC input line to neutral voltage and the inverter line to neutral voltage. Consider the phasor diagram illustrated in FIG. 5. Phasor 107 represents the output voltage $V_a$ to be provided on output line 27, phasor 108 represents the output voltage $V_b$ to be provided from the inverter 35 on output line 28 of the converter, and phasor 109 represents the voltage signal $V_c$ to be provided on output line 29 of the converter. Since a balanced three phase output voltage signal is desired, the three phasors 107, 108, and 109 are drawn phase shifted from each other by 120°. Assuming that the bi-directional switch 32 is closed, the input voltage $V_{in}$ is the voltage $V_a$–$V_c$, which is represented by the phasor 111 illustrated in FIG. 5. In order to achieve the desired 120° phase separation between $V_a$, $V_b$, and $V_c$, it is apparent that the inverter output voltage $V_{inv}$, which is equal to $V_b$–$V_c$, can be represented by the phasor 113. The phasor diagram of FIG. 5 thus illustrates that, in order to achieve the desired three phase output voltage signal from the single phase input voltage signal $V_{in}$, the inverter output voltage $V_{inv}$ may be controlled to lag the input voltage $V_{in}$ by 60°. Alternatively, it can be shown that balanced three phase line to neutral voltages can also be obtained if the inverter output voltage signal $V_{inv}$ is controlled so as to lead the input voltage $V_{in}$ by 60°. If the inverter voltage lags the input voltage, the converter is said to operate in a positive sequence mode. If the inverter voltage leads the input voltage, the converter is said to operate in a negative sequence mode. It has been shown that, in the positive sequence mode, as illustrated in FIG. 5, the current drawn by a three phase motor load from the AC line, $I_1$, has close to unity displacement factor. In this operating mode, the inverter 35 is seen to supply most of the reactive current requirement of the load. Thus, the input line current drawn by the inverter 35 is at unity displacement factor due to the input diode bridge. Therefore, the positive sequence mode features a high input power factor on the input AC line, as well as fairly low current distortion levels, and is preferred.

Control of the inverter switching devices 50 and 51 to provide the desired output voltage waveform signal is thus preferably accomplished by the controller 70 by providing the input voltage waveform on a line 120 to a 60° phase shift circuit 122. The voltage signal provided on the line 120 is preferably the input voltage signal $V_{in}$ taken after the bi-directional switch 32. Under steady state operating conditions, the bi-directional switch 32 is fully turned on, and a sinusoidal voltage waveform is applied to the motor, on output line 27, as well as to the inverter 35. The output of the 60° phase shift circuit 122 is the input voltage waveform $V_{in}$ shifted by 60°, which forms an inverter output voltage waveform reference signal on line 124. A pulse width modulation strategy is preferably employed to modulate the inverter output voltage waveform reference signal to provide inverter control signals to control switching of the inverter switching devices 50 and 51. This may be accomplished by comparing the inverter output voltage waveform reference signal to a high frequency, e.g., 6 kHz, triangle carrier signal, at a comparator 126. Other well known pulse width modulation techniques which do not employ triangle carrier signals may also be used. The pulse width modulated output of the comparator 126 is provided directly to the gate 90 for providing a control signal to control inverter switching device 50, and is inverted by an inverter 128 before being provided to the gate 91, for providing a control signal for controlling operation of inverter switching device 51. Thus, inverter switching devices 50 and 51 are turned on alternately at a relatively high frequency to synthesize the desired inverter output voltage waveform. Note that inverter switching devices 50 and 51 are never turned on simultaneously.

As discussed previously, under steady state operating conditions, bi-directional switch 32 is fully turned on, and a sinusoidal input voltage may be applied to a motor 30, on output line 27, and to the inverter 35, via the bi-directional switch 32. Under this condition, and employing the inverter control scheme just described, the inverter 35 is controlled to supply sinusoidal currents to the motor, on output line 28. As mentioned previously, under positive sequence operation, most of the reactive power requirements of the motor are supplied by the inverter 35, while the phase directly connected across the AC line draws all the real power. This results in the converter-motor system having a higher displacement factor than if the motor were operating from a balanced sinusoidal three phase supply. Typical displacement factors of 0.97–0.99 have been observed. The overall power factor, including harmonics, is also seen to be higher than 0.93. As the power flows directly from the single phase line to the motor, and the inverter 35 handles mainly reactive power, the efficiency of the converter is also extremely high, typically greater than 97%.

By controlling the inverter switching devices 50 and 51 in the manner described previously, a sinusoidal output voltage waveform is synthesized on output line 28 of the converter. Preferably, the RMS output voltage level of the inverter output signal is maintained relatively constant. In order to maintain a relatively constant RMS voltage level, the inverter DC bus voltage must remain relatively stable. However, undesirably wide swings in the DC bus voltage may occur during start-up of the converter. A DC bus feed forward compensator is preferably provided in the controller circuit 70 to account for these wide swings in the DC bus voltage. The DC bus feed forward compensator is employed to adjust the amplitude of the inverter output voltage waveform reference signal on line 124 to thereby adjust the inverter output pulse width to provide a relatively steady inverter RMS output voltage level in the presence of wide swings in the DC bus voltage.

The DC bus feed forward compensator circuit compares a measured DC bus voltage level, i.e., a DC bus feedback signal, with a nominal DC bus voltage reference signal representing the desired steady state DC bus voltage level, at a comparator 130. The resulting DC bus voltage difference signal, which represents the difference between the desired DC bus voltage level and the measured DC bus voltage level, is multiplied by a constant K at 132. The resulting DC bus feed forward compensator signal is multiplied by the inverter output voltage waveform reference signal at 134. The output of the multiplier 134 is a DC bus feedforward compensator signal which is positive during the positive half cycle of the inverter output voltage waveform reference signal, negative during the negative half cycle of the inverter output voltage waveform reference signal and zero when the inverter output voltage waveform reference signal is zero. This signal is combined at 136 with the inverter output voltage waveform reference signal on line 124, before the reference signal is modulated by the triangle carrier signal at comparator 126. The effect of the DC bus feed forward compensator signal is to adjust the amplitude of the inverter output voltage waveform reference signal, which, after modulation, results in an adjustment of the inverter output pulse width such that a relatively stable inverter RMS output voltage level is maintained in the presence of wide swings in the DC bus voltage that occur during start-up, or otherwise.

In accordance with the present invention, it is also preferable to control the inverter switching devices 50 and 51 to regulate the maximum DC bus voltage in the inverter 35. Under light load conditions, and potentially under motor starting conditions, a motor power factor can become very low. Under these conditions, it is likely that the direction of power flow from the inverter 35 to the motor is reversed. Thus, under these conditions, power may actually flow from the motor into the inverter, causing the DC bus voltage to increase beyond the maximum desired DC bus voltage level. In accordance with the present invention, this condition is countered by shifting the phase of the inverter output voltage such that the net power flow into the inverter from the converter input and output lines is zero.

Phase shifting of the inverter output voltage signal to regulate the maximum DC bus voltage is accomplished by appropriate adjustment of the control signals provided to the inverter switching devices 50 and 51. A maximum DC bus voltage regulator circuit may be implemented in the controller 70 for this purpose. The measured DC bus voltage (DC bus voltage feedback signal) is subtracted from a maximum DC bus voltage set-point signal at 138. The resulting difference signal, representing the difference between the measured DC bus voltage and the maximum desired DC bus voltage, is provided to a proportional-integral controller 140. The integrator time constant for the proportional-integral controller 140 is established by an integrator time constant signal on line 141. For application of the controller 70 to a wide range of motor load types, it is preferable that the integrator time constant be set on the order of one second. The integrator should preferably be set for maximum phase shift on converter/motor startup. Once the motor is started, the integrator follows by ramping up to the steady state condition. This guarantees that power will not flow back to the inverter DC bus under the wide range of starting parameters of various motor types. The output of the proportional-integral controller 140 is provided to a phase shift selection circuit 142, which selects the inverter output voltage signal phase shift necessary to bring the net power flow into the inverter to zero. Preferably, the inverter switching devices 50 and 51 are only controlled to adjust the inverter output voltage signal phase if there is positive power flow into the inverter from the motor. As the power flow into the inverter from the motor increases, a greater phase shift of the inverter output voltage signal is required to bring the net power flow into the inverter to zero. Preferably, the phase shift implemented by the maximum DC bus voltage regulation circuit is limited such that the inverter output voltage signal phase is not shifted so much as to significantly unbalance the three phase power signal provided to the motor 30. The output of the phase shift selection circuit 142 is a sinusoidal signal which is multiplied by the AC input voltage signal at 146. As discussed previously, the AC input voltage signal is phase shifted by 60° from the inverter output voltage waveform reference signal. The effect of multiplying the two sinusoidal signals at 146 is, therefore, to produce a maximum DC bus voltage regulation phase shift signal having an amplitude which produces a phase shift when added to the inverter output voltage waveform reference signal which depends on the amplitude of the DC bus voltage regulation phase shift signal. The DC bus voltage regulation phase shift signal is added to the inverter output voltage waveform reference signal at 150. The effect of the maximum DC bus voltage regulation phase shift signal on the output voltage waveform reference signal is to phase shift the reference signal. This, in turn, after modulation by the triangle carrier signal at 126, causes inverter switching device control signals to be provided to the inverter switching devices 50 and 51 to control the inverter switching devices 50 and 51 to provide, when necessary, a phase shifted inverter output voltage waveform signal which ensures that there is zero net power flow into the inverter.

As discussed previously, under steady state operating conditions, the bi-directional switching device 32 is fully turned on. Under start-up conditions, however, the bi-directional switching device 32 is controlled to operate as a soft-starter for the single phase to three phase converter and the motor to which the converter is connected. The bi-directional switching device 32 is controlled to ramp up the current provided on output line 27 to the motor. This control scheme also results in a ramp up of the current provided to the inverter DC bus, thereby providing a soft-charge for the inverter DC bus capacitors 47 and 48. The bi-directional switching device 32 is simultaneously controlled to limit the inrush current drawn into the converter to a desired level. Soft start-up and inrush current control are preferably provided by phase controlling the bi-directional switch 32 to adjust the amplitude of the current signal provided through the bi-directional switch 32 to the motor 30 and the inverter 35.

Control of the bi-directional switch 32 to provide the desired current amplitude is preferably accomplished in the controller 70 by first converting the measured current through the bi-directional switching device 23 to a DC voltage signal having an amplitude corresponding to the true RMS value of the bi-directional switching device current. The circuit 152 for converting the RMS current level of the bi-directional switch current to a DC signal preferably includes a filter at the fundamental frequency of the input current signal, e.g., 60 Hz, to ensure that only the fundamental component of the current signal is considered. The output of the RMS to DC converter 152 is a DC voltage signal on line 154 corresponding to the RMS current level through the bi-directional switch 32. This signal is subtracted from a current limit set point signal at 156. The maximum value of the current limit set point signal is preferably user selectable to any desired level. As discussed previously, the maximum current limit set point may be selected by adjusting the resistance value of a variable resistor 84 connected to the controller 70 (see FIG. 3). At start-up, the current limit set point signal is ramped up at a desired rate to the maximum current limit to provide the desired soft-start operation of the motor. The difference between the bi-directional switch RMS current level and the current limit set point signal value is provided on line 158 to a proportional-integral controller 160. The output of the proportional-integral controller is a signal on line 161 which corresponds to the difference in voltage between the input signal on line 23 and the output signal on output line 27 which is required to provide the desired current level on the output line 27 to the motor 30. This signal is provided to a bi-directional switch phase controller 162, which generates bi-directional switching device control signals for phase controlling the bi-directional switching device 32 to implement the desired output signal. The bi-directional switching device control signals are provided to the bi-directional switching device AND gates 92.

By phase controlling the bi-directional switching device 32 to control the amplitude of the current provided to a motor during start-up, the inrush current drawn from the converter input terminals 21 and 22 is controlled, and soft start of the motor is achieved. As discussed previously, the inrush current can be controlled to any desired value. It should be noted that a motor's ability to provide starting torque is highly dependant on the level of starting current allowed. For instance, at 200% of rated current in the AC input line, starting torque has been measured to be approximately 50% of rated torque for a motor which is provided power by a single phase to three phase converter in accordance with the present invention. Starting torque is projected to increase to about 100% of rated torque at 300% of rated input current. It is also noted that the positive sequence mode of operation results in lower input line currents. For instance, with 200% of rated current in the input line during start-up, almost 400% of rated current flows in the motor itself. This fact is also reflected in the higher input power factor realized during motor start-up than would be possible with direct line connected motors. This suggests that a single phase to three phase converter in accordance with the present invention has the lowest cost for variable torque type of loads, and can realize higher starting torque with higher inrush currents and appropriate overrating of the inverter and bi-directional switching devices.

It should be noted that control of the inverter switching devices 50 and 51 is preferably based on a 60° phase shift of the input voltage signal on input line 23 as detected after the bi-directional switching device 32. Thus, even though the input current provided to the motor on line 27 is phase shifted by the bi-directional switching device 32 during start-up, the inverter switching devices 50 and 51 are preferably controlled to provide an inverter output voltage signal which is phase shifted 60° from this signal.

The controller 70 preferably also detects certain extreme operating conditions which may damage the inverter 35, and turns off the inverter switching devices 50 and 51 and the bi-directional switch 32 to prevent such damage from occurring. A DC bus overvoltage protection circuit 164 monitors the DC bus voltage on line 165 and provides a low output on line 166 when the monitored DC bus voltage exceeds a high DC bus overvoltage protection threshold level. A low output on line 166 disables the AND gates 90, 91, and 92, thereby preventing control signals from being delivered to the inverter switching devices 60 and 61 and the bi-directional switch 32. Thus, all of the switching devices are turned off, preventing further charging of the DC bus capacitors 47 and 48 which might damage the inverter 35. The DC bus overvoltage protection circuit may also cause an LED 83 to be turned on when an overvoltage condition is detected, as discussed previously with reference to FIG. 3.

A peak current limit circuit 167 is preferably provided to monitor the inverter current on line 168. This is the current flowing through the inverter switching devices 50 and 51 on output line 28. The peak current limit circuit 167 provides a low output on line 169 when the inverter current exceeds a peak current limit threshold level. A low output on line 169 disables the AND gates 90 and 91, thereby preventing control signals from being delivered to the inverter switching devices 50 and 51. Thus, the inverter switching devices 50 and 51 are turned off when the current through them becomes excessive, to prevent damage to the switching devices 50 and 51. The peak current limit circuit 167 may also cause an LED 82 to be turned on when an overcurrent condition is detected, as discussed previously with reference to FIG. 3. The peak current limit circuit 167 preferably turns the inverter switching devices back on when the inverter current falls below a lower threshold current level. Thus, the peak current limit circuit 167 limits the maximum inverter current, but the current provided to a motor load is preferably not completely cutoff during a cycle so that the motor is not shut down.

A prototype single phase to three phase converter in accordance with the present invention was constructed and tested. To test the prototype converter, the converter was connected to provide power to a three phase AC induction motor from a single phase AC power supply. At full load, the estimated AC motor output power was 3.2 horsepower. For testing, the 3 hp AC induction motor was mechanically coupled to a dynamometer which was implemented using a separately excited DC motor. The DC motor field was excited with a fixed voltage, and the armature was connected to a resistive load bank of approximately 3 ohms. Under start-up conditions, the resistive load results in torque levels that vary linearly with speed and are much more demanding than the starting torque requirements encountered with variable torque pumping in fan loads. An analog tachometer was connected to the DC motor for monitoring motor speed.

Figure 6:
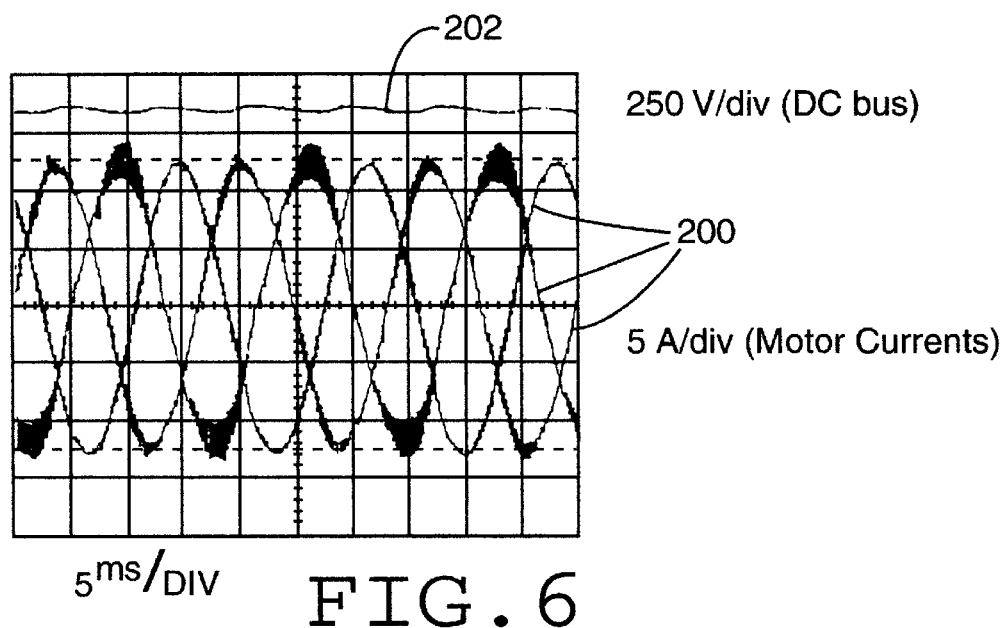
FIG. 6 is a waveform diagram illustrating the inverter DC bus voltage and steady state motor currents for a three phase motor being powered by a single phase to three phase converter in accordance with the present invention.
Figure 7:
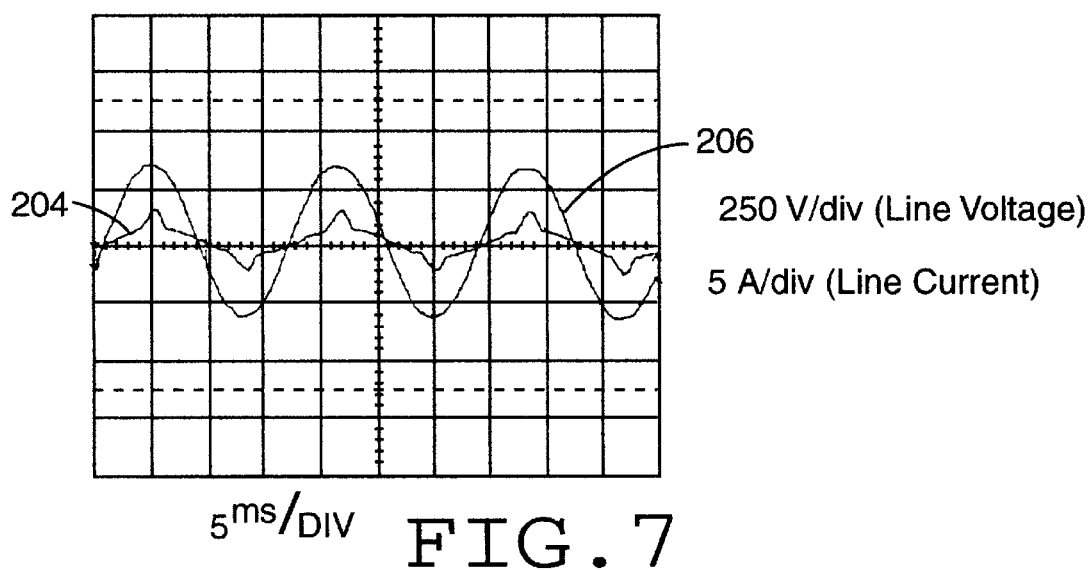
FIG. 7 is a waveform diagram illustrating the converter input line current and voltage waveforms for a single phase to three phase converter in accordance with the present invention while providing power to a three phase motor under steady state full load operating conditions.

FIG. 6 illustrates the steady state three phase motor currents 200 and the DC bus voltage 202 for the prototype converter as tested under full load conditions. FIG. 7 shows the input line current 204 and input line voltage 206 waveforms under the same conditions. From FIG. 6, it can be seen that the experimental single phase to three phase converter of the present invention provides three phase output currents which are well balanced and sinusoidal. The experimental results show that the worst case total harmonic distortion is in the inverter connected motor phase, and that the total harmonic distortion in this phase is less than 5%. Examining the input line current 204 and voltage 206 waveforms, in FIG. 7, it is seen that the displacement factor is approximately 0.99, while the input current total harmonic distortion is approximately 30%, for an overall power factor of 0.94. The input current crest factor is 2.1, versus 1.41 for sinusoidal current drawn from the line. The experimental steady state performance illustrated in FIGS. 6 and 7 shows that a single phase to three phase converter in accordance with the present invention realizes substantial improvement in input side performance, including input power factor, when compared with direct line connected motors, and also in terms of inverter efficiency and input current total harmonic distortion for three phase inverter fed motors.

Figure 8:
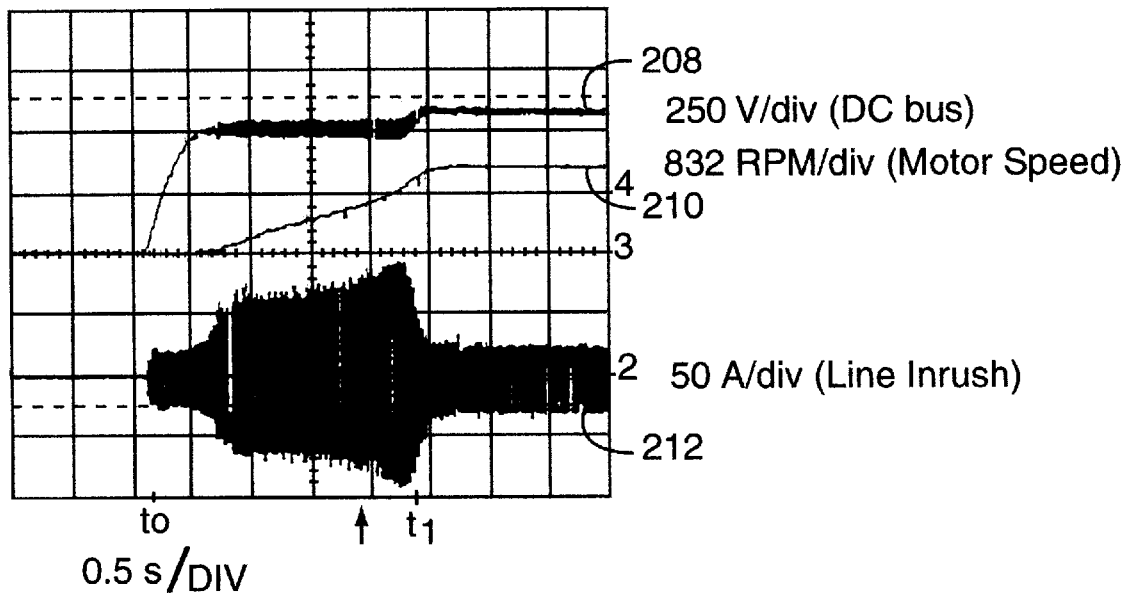
FIG. 8 is a waveform diagram illustrating DC bus voltage, motor speed, and input line current during start-up of a motor by a single phase to three phase converter in accordance with the present invention.
Figure 9:
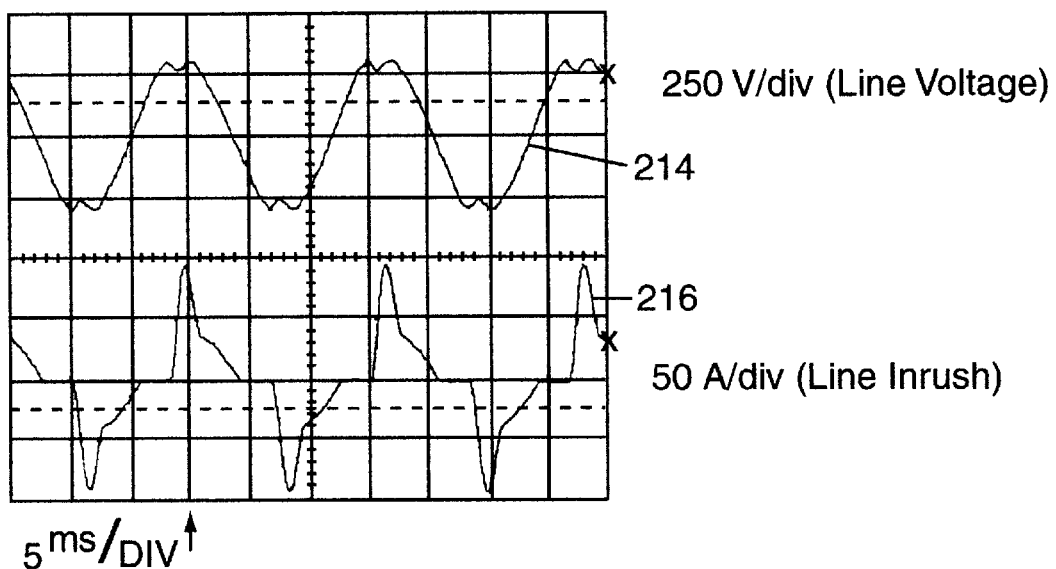
FIG. 9 is a waveform diagram showing in detail input line current and voltage waveforms for a single phase to three phase converter in accordance with the present invention under motor start-up conditions.

The waveforms of FIG. 8 depict the start-up of the 3 hp AC induction motor by the experimental single phase to three phase converter with the DC motor providing a dynamometer load connected to provide a full load at rated speed. FIG. 8 illustrates the DC bus voltage 208, motor speed 210, and inrush current 212 during these motor start-up conditions. As illustrated, the line inrush current 212 is well controlled as the motor ramps up from zero to full speed. In accordance with the present invention, the bi-directional switching device 32 in the converter is controlled beginning at time $t_0$ to ramp up the line current 212 to its limit value to allow the motor to start accelerating. The motor reaches full speed in approximately two seconds, at time $t_1$, at which point the inrush current 212 reduces to the full load value. FIG. 9 shows in more detail the input line voltage 214 and current 216 waveforms under the start-up conditions described. The condition depicted corresponds to approximately 2.9 p.u. inrush line current, and shows the high power factor even under start-up conditions.

The experimental converter was also tested under steady state operating conditions over a typical range of input line voltages (208–240 volts AC). Operation at full power is obtained over this input power range with good input and motor side characteristics. Operation at no-load showed no problems. Test data indicates that the experimental power conversion circuit and controls are fairly insensitive to line voltage variations and load variations.

Tests were also run on the experimental converter to obtain starting torque measurements for various line voltage and line inrush current limit levels. The torque calculations were made using a shorted DC generator, which restricts motor speed to less than 5% of rated speed, and is essentially equivalent to a locked rotor test. The nominal full load current in the DC machine was measured to be 25 amperes, corresponding to full load torque. For the motor under test, as the line inrush current limit was varied from 102% of full load to 256% of full load, at 230 volts input, the developed starting torque varied from 10% of full load torque to 84% of full load torque. At the same time, the actual motor inrush current varied from 206% of its full load level to 469% of its full load level. Further, as the line inrush current limit level was increased from 102% to 256%, the displacement factor improved from 0.36 to 0.73, while the overall power factor improved from 0.2 to 0.68. Considering that the induction motor's full load power factor is 0.69, this demonstrates the improvement in line side characteristics during start-up of the single phase to three phase converter in accordance with the present invention, when compared to a direct on-line start motor.

Although described in detail herein with reference to a motor load, it should be understood that a single phase to three phase converter in accordance with the present invention may be employed in any single phase to three phase power conversion application. It is also understood that the invention is not confined to the particular embodiments set forth herein as illustrative, but embraces such modified forms thereof as come within the scope of the following claims.

What is claimed is:

1. An apparatus for converting a single phase AC input signal to a three phase AC output signal, comprising:
   (a) first and second single phase AC input terminals connected to first and second input lines, respectively;
   (b) three output lines connectable to a three phase load, a first of the output lines connected to the first input line and a second of the output lines connected to the second input line;
   (c) an inverter circuit connected to the input lines to receive single phase AC power therefrom and having an output node connected to a third of the output lines, the inverter circuit responsive to inverter control signals to provide an AC output signal at the inverter circuit output node;
   (d) a bi-directional switch responsive to bi-directional switch control signals connected in series with the first input line between the first input terminal and both the first output line and the inverter circuit; and
   (e) controller means for providing the inverter control signals to the inverter circuit to control the inverter circuit to provide the AC output signal at the output node of the inverter to provide a three phase AC waveform signal on the three output lines and for providing the bi-directional switch control signals to phase control the bi-directional switch during start-up of a load to adjust the amplitude of the three phase AC waveform signal to ramp up the current provided on the output lines to soft start the load and to limit inrush current to the apparatus.

2. The apparatus of claim 1 wherein the inverter includes DC bus lines, a pair of diodes connected together in series at a first node across the DC bus lines, a pair of DC bus capacitors connected together in series at a second node across the DC bus lines, and a pair of inverter switching devices responsive to the inverter control signals connected together in series at the inverter output node across the DC bus lines, and wherein a one of the input lines is connected to the first node between the diodes and the other of the input lines is connected to the second node between the DC bus capacitors.

3. The apparatus of claim 2 wherein the inverter switching devices are transistors.

4. The apparatus of claim 3 wherein the inverter switching devices are IGBTs.

5. The apparatus of claim 1 wherein the controller means includes means for phase shifting a single phase input voltage signal on the first and second input lines by 60 degrees to form an inverter output voltage waveform reference signal and means for modulating the inverter output voltage waveform reference signal to generate the inverter control signals.

6. The apparatus of claim 5 wherein the means for phase shifting the single phase input voltage signal shifts the single phase input voltage signal on the first and second input lines as taken at a point between the bi-directional switch and the inverter.

7. The apparatus of claim 5 wherein the means for phase shifting the single phase input voltage signal phase shifts the single phase input voltage signal by 60 degrees in a direction such that the single phase input voltage signal leads the inverter output voltage waveform reference signal.

8. The apparatus of claim 5 wherein the means for modulating the inverter output voltage waveform reference signal includes means for comparing the inverter output voltage waveform reference signal to a high frequency carrier signal.

9. The apparatus of claim 8 wherein the high frequency carrier signal is a triangle carrier signal.

10. The apparatus of claim 8 wherein a frequency of the high frequency carrier signal is at least 6 kHz.

11. The apparatus of claim 1 wherein the controller means includes DC bus feedforward compensator means for adjusting the inverter control signals to maintain a stable AC output voltage level at the output node of the inverter despite swings in the DC bus voltage level.

12. The apparatus of claim 1 wherein the controller means includes maximum DC bus voltage regulation means for adjusting the inverter control signals to shift the phase of the AC output voltage at the output node of the inverter to regulate the net power flow into the inverter to approximately zero.

13. The apparatus of claim 1 wherein the controller means for providing the bi-directional switch control signals at load start-up includes means for generating a bi-directional switch current signal corresponding to the RMS current level provided to the load through the bi-directional switch, means for comparing the bi-directional switch current signal to a current limit setpoint signal to form a bi-directional switch current difference signal, and means for deriving the bi-directional switch control signals from the bi-directional switch current difference signal to phase control the bi-directional switch during start-up of the load to adjust the amplitude of the AC current provided to the load to limit the current provided to the load to a current limit set point level.

14. The apparatus of claim 13 comprising additionally means for selecting a maximum value of the current limit setpoint signal.

15. The apparatus of claim 14 wherein the means for selecting the maximum value of the current limit setpoint signal includes a variable resistor connected to the controller means.

16. The apparatus of claim 13 wherein the means for deriving the bi-directional switch control signals includes a proportional-integral controller.

17. The apparatus of claim 1 wherein the controller means comprises additionally means for preventing the providing of the inverter control signals to the inverter circuit when a current level through the inverter circuit exceeds a peak current limit threshold level.

18. An apparatus for converting a single phase AC input signal to a three phase AC output signal, comprising:

(a) first and second single phase AC input terminals connected to first and second input lines, respectively;

(b) three output lines connectable to a three phase load, a first of the output lines connected to the first input line and a second of the output lines connected to the second input line;

(c) an inverter circuit connected to the input lines to receive single phase AC power therefrom and having an output node connected to a third of the output lines, the inverter circuit responsive to inverter control signals to provide an AC output signal at the inverter circuit output node;

(d) a bi-directional switch responsive to bi-directional switch control signals connected in series with the first input line between the first input terminal and both the first output line and the inverter circuit; and (e) controller means for providing the inverter control signals to the inverter circuit including means for phase shifting a single phase input voltage signal on the first and second input lines by 60 degrees to form an inverter output voltage waveform reference signal and means for modulating the inverter output voltage waveform reference signal to generate the inverter control signals to control the inverter to provide the AC output signal at the output node of the inverter to provide a three phase AC waveform signal on the three output lines and maximum DC bus voltage regulation means for adjusting the inverter control signals to shift the phase of the AC output voltage at the output node of the inverter to regulate the net power flow into the inverter to approximately zero, and means for providing the bi-directional switch control signals to phase control the bi-directional switch during start-up of a load to adjust the amplitude of the three phase AC waveform signal to ramp up the current provided on the output lines to soft start the load and to limit inrush current to the apparatus.

19. The apparatus of claim 18 wherein the inverter includes DC bus lines, a pair of diodes connected together in series at a first node across the DC bus lines, a pair of DC bus capacitors connected together in series at a second node across the DC bus lines, and a pair of inverter switching devices responsive to the inverter control signals connected together in series at the inverter output node across the DC bus lines, and wherein a one of the input lines is connected to the first node between the diodes and the other of the input lines is connected to the second node between the DC bus capacitors.

20. The apparatus of claim 19 wherein the inverter switching devices are transistors.

21. The apparatus of claim 20 wherein the inverter switching devices are IGBTs.

22. The apparatus of claim 18 wherein the means for phase shifting the single phase input voltage signal shifts the single phase input voltage signal on the first and second input lines as taken at a point between the bi-directional switch and the inverter.

23. The apparatus of claim 18 wherein the means for phase shifting the single phase input voltage signal for phase shifts the single phase input voltage signal by 60 degrees in a direction such that the single phase input voltage signal leads the inverter output voltage waveform reference signal.

24. The apparatus of claim 18 wherein the means for modulating the inverter output voltage waveform reference signal includes means for comparing the inverter output voltage waveform reference signal to a high frequency carrier signal.

25. The apparatus of claim 24 wherein the high frequency carrier signal is a triangle carrier signal.

26. The apparatus of claim 24 wherein a frequency of the high frequency carrier signal is at least 6 kHz.

27. The apparatus of claim 18 wherein the controller means comprises additionally DC bus feedforward compensator means for adjusting the inverter control signals to maintain a stable AC output voltage level at the output node of the inverter despite swings in the DC bus voltage level.

28. The apparatus of claim 18 wherein the controller means for providing the bi-directional switch control signals at load start-up includes means for generating a bi-directional switch current signal corresponding to the RMS current level provided to the load through the bi-directional switch, means for comparing the bi-directional switch current signal to a current limit setpoint signal to form a bi-directional switch current difference signal, and means for deriving the bi-directional switch control signals from the bi-directional switch current difference signal to phase control the bi-directional switch during start-up of the load to adjust the amplitude of the AC current provided to the motor to limit the current provided to the motor to a current limit set point level.

29. The apparatus of claim 28 comprising additionally means for selecting a maximum value of the current limit setpoint signal.

30. The apparatus of claim 29 wherein the means for selecting the maximum value of the current limit setpoint signal includes a variable resistor connected to the controller means.

31. The apparatus of claim 28 wherein the means for deriving the bi-directional switch control signals includes a proportional-integral controller.

32. The apparatus of claim 18 wherein the controller means comprises additionally means for preventing the providing of the inverter control signals to the inverter circuit when a current level through the inverter circuit exceeds a peak current limit threshold level.

33. A method for converting a single phase AC input signal on first and second input lines to a three phase AC output signal on first, second, and third output lines, comprising the steps of:

(a) connecting the first output line to the first input line and the second output line to the second input line;

(b) connecting an inverter between the first and second input lines, to receive the single phase AC input power therefrom, and the third output line;

(c) connecting a bi-directional switch in series with the first input line between a first input terminal and both the first output line and the inverter;

(d) controlling the inverter to provide an inverter AC output signal on the third output line having an amplitude and phase to provide a balanced three phase AC waveform signal on the three output lines; and (e) phase controlling the bi-directional switch during start-up of a load connected to the three output lines to ramp up the current provided to the inverter and on the output lines to soft start the load.

34. The method of claim 33 wherein the step of controlling the inverter includes the step of providing an inverter AC output signal having a phase which is phase shifted by 60 degrees from the single phase AC input voltage signal on the first and second input lines.

35. The method of claim 34 wherein the step of controlling the inverter includes the step of phase shifting the single phase AC input voltage signal on the first and second input lines as taken at a point between the bi-directional switch and the inverter.

36. The method of claim 34 wherein the step of controlling the inverter includes the step of providing an inverter AC output voltage signal having a phase which is phase shifted from the AC input voltage signal by 60 degrees in a direction such that the single phase AC input voltage signal leads the inverter AC output voltage signal.

37. The method of claim 33 comprising additionally the step of shifting the phase of the inverter AC output voltage signal to regulate the net power flow into the inverter to approximately zero.

38. The method of claim 33 comprising additionally the step of preventing the providing of the inverter AC output voltage signal as long as a current level through the inverter exceeds a peak current limit threshold level.

* * * * *